United States Patent [19]
Ikeda et al.

[11] Patent Number: 5,162,714
[45] Date of Patent: Nov. 10, 1992

[54] NUMERICAL CONTROL DEVICE FOR TRANSFER MACHINES

[75] Inventors: Yoshiaki Ikeda, Minamitsuru; Nobuyuki Kiya, Hachioji; Shoichi Otsuka, Minamitsuru, all of Japan

[73] Assignee: Fanuc Ltd, Minamitsuru, Japan

[21] Appl. No.: 601,724

[22] PCT Filed: Feb. 26, 1990

[86] PCT No.: PCT/JP90/00232

§ 371 Date: Oct. 23, 1990

§ 102(e) Date: Oct. 23, 1990

[87] PCT Pub. No.: WO90/10899

PCT Pub. Date: Sep. 20, 1990

[30] Foreign Application Priority Data

Mar. 10, 1989 [JP] Japan .................. 1-59093

[51] Int. Cl.$^5$ .................................. G05B 19/18
[52] U.S. Cl. .................................. 318/569
[58] Field of Search ........... 318/569, 571, 567, 561, 318/573, 603; 364/174, 474.21, 474.34, 474.28

[56] References Cited

U.S. PATENT DOCUMENTS

| | | | |
|---|---|---|---|
| 4,469,993 | 9/1984 | Swanson et al. | 318/561 |
| 4,506,321 | 3/1985 | Comstock et al. | 364/174 |
| 4,584,509 | 4/1986 | Kiya | 318/571 |
| 4,604,560 | 8/1986 | Inagaki et al. | 318/567 |

Primary Examiner—William M. Shoop, Jr.
Attorney, Agent, or Firm—Staas & Halsey

[57] ABSTRACT

A numerical control device adapted to control a plurality of transfer machines mounted on a transfer line. The numerical control device is composed of an NC section (13) for controlling the axes of the transfer machines and a PMC section (14) for executing sequence control. The PMC section (14) reads current position data from a current position register (16) of the NC section (13) through a window, and compares the read data with previously set zone data (19). A function instruction (18a) delivers the result of the comparison as a zone signal, and executes a modification control of an execution sequence by using the zone signal. Therefor, a high-accuracy region signal can be set.

4 Claims, 2 Drawing Sheets

NUMERICAL CONTROL DEVICE FOR TRANSFER MACHINES

BACKGROUND OF THE INVENTION

The present invention relates to a numerical control device for transfer machines adapted to control transfer machines mounted on a transfer line. More particularly, the present invention is directed to a numerical control device for transfer machines having a zone signal output function.

Numerical control devices for transfer machines mounted on a transfer line are used as control devices for working machines, and assembling and inspecting machines, etc., for mass production lines in, for example, the automotive industry.

These numerical control devices require a sequence control function and an axis control function. Among these functions is a zone signal output function which is indispensable for the execution of the sequence control function, such as a synchronization between the machines which comprise the transfer line and a program selection at the restart of machining.

The zone signal output function will now be described with reference to the drawings.

FIG. 2 is a diagram illustrating a prior art numerical control device (CNC) 1 which is used to control a machine tool and the rotation of a servomotor 2. The servomotor 2 rotates in response to a command from the numerical control device 1, and a ball screw 3 is connected directly to the servomotor 2 and rotates in synchronism with the rotation of the servomotor 2. Thus, as the servomotor 2 is rotated, a tool post 4 is moved along the ball screw 3. The tool post 4 is fitted with a tool 4a, by which a workpiece 5 is machined into a desired shape. After the machining is finished, the workpiece 5 is moved along the transfer line to a position at which the next machining process will be executed.

During the machining of this workpiece which moved along the transfer line, it is necessary to have precise knowledge of the position (absolute axis position) of the tool post 4 and to control the sequence of the machining processes accordingly.

Conventionally, therefore, an overall stroke 6 for the movement of the tool post 4 is, divided into N (integer) number of equal parts. Zone numbers 1, 2, 3, ... N are affixed individually to the N number of equal zones (N is 128 or 256). The numerical control device 1 detects the zone where the tool post 4 exists by a comparison made on the basis of current position data, to thereby determine the zone number concerned and output that number as a zone signal. A programmable machine controller) incorporated with the numerical control device reads the zone signal through a window, determines the next process in the sequence to be controlled, and performs an axis control.

When the overall stroke are 1 m and N is equal to 128, respectively. According to a conventional system, the zone detection unit is about 7.8 mm. That is, the detection unit is very imprecise, and thus it is difficult to set a machining origin for minimized machining cycles, or to optimize the start-stop timing for a loader and peripheral equipment. Also, this problem constitutes a restriction of the machine design. Even if a certain zone number is decided, the detection unit is always subject to errors in a range specified by this zone number, and thus the zone cannot be perceived within a range smaller than that of the detection unit.

The zone can be recognized with greater accuracy by increasing the number N to increase the number of points in the zone, and making the detection unit smaller. In this case, however, the load on a CPU of the numerical control device becomes greater, and thus the capacity of the axis control function is reduced.

SUMMARY OF THE INVENTION

An object of the present invention is to provide a numerical control device for transfer machines capable of obtaining a zone signal output with a high accuracy without increasing the load on a CPU in the numerical control device.

To achieve the above object, according to the present invention, there is provided a numerical control device for controlling a plurality of transfer machines mounted on a transfer line. The numerical control device comprises axis control means for controlling the axes of the transfer machines and PMC control means for executing a sequence control of the transfer machines. The PMC control means includes a function instruction adapted to read current position data from the axis control means through a window, compare the read data with previously set zone data, and output the result of the comparison as a zone signal. The PMC control means also executes a modification control of an execution sequence by using the zone signal.

The PMC control means directly reads the current position data for the axis from the axis control means through the window, and compares the read data with the previously set zone data. Therefore the axis control means does not need to output the zone signal. Thus, the capacity of the axis control means is not lowered. Moreover, since the read data is compared with the previously set zone data, the delivered zone signal can correspond to the machine tool by setting a large number of zone data. Furthermore, since the current position data is read directly from the axis control means, the current position can be detected with high accuracy.

DESCRIPTION OF THE PREFERRED EMBODIMENT

An embodiment of the present invention will now be described with reference to the drawings.

Figure 1:
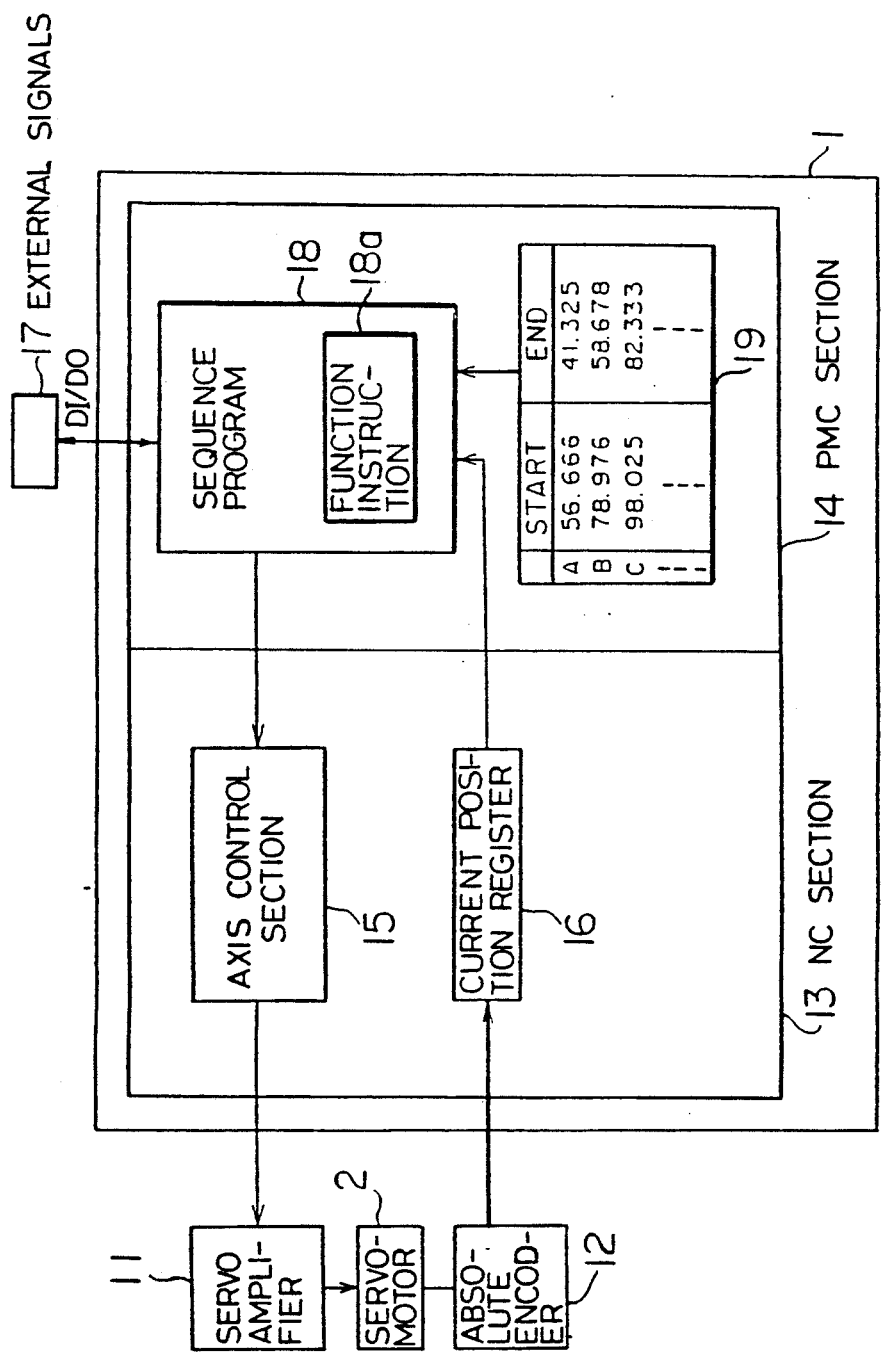
FIG. 1 is a block diagram of a numerical control device for transfer machines, according to the present invention.
Figure 2:
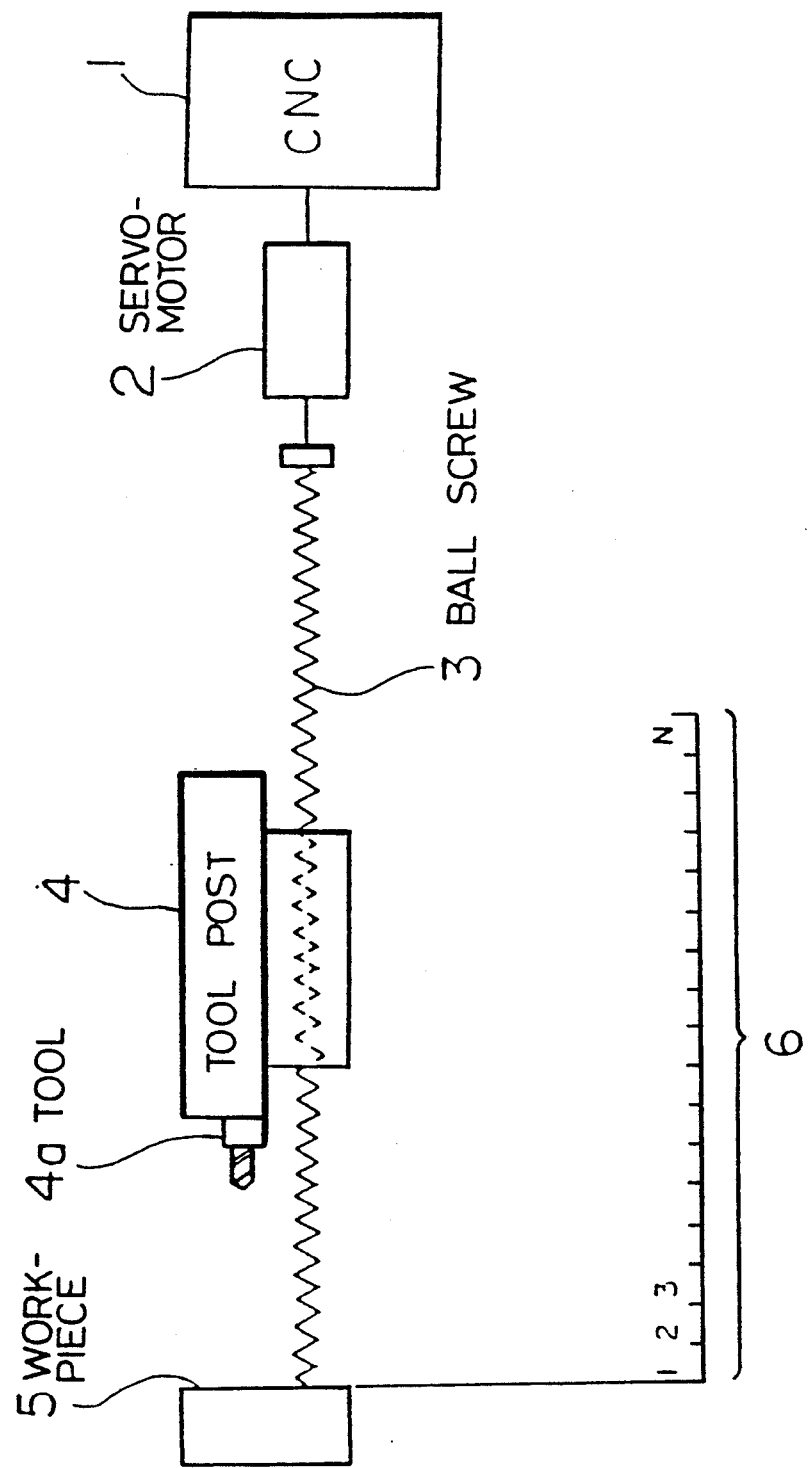
FIG. 2 is a prior art programmable machine controller.

FIG. 1 is a block diagram of a numerical control device for transfer machines, according to the present invention. The numerical control device 1, which serves to control a machine tool, comprises an NC section 13 for executing an axis control function and a PMC section 14 for executing a sequence control function.

The NC section 13 includes an axis control section 15. The hardware (not shown) of the axis control section 15 is composed of a CPU for numerical control, a ROM for storing a system program, a RAM for storing various data, and a nonvolatile memory for storing parameters and the like. Further, the NC section 13 includes a current position register 16 for storing current position data from an absolute encoder 12, which is connected directly to a servomotor 2.

A servo amplifier 11 receives an axis movement command from the axis control section 15, and controls the rotation of the servomotor 2. The absolute encoder 12, which is contained in the servomotor 2, is backed up by a battery, and can detect the absolute position of the servomotor 2 even after the main power supply is turned off.

The hardware (not shown) of the PMC section 14 is composed of a CPU for sequence control, a ROM or RAM for storing system program for sequence control, sequence programs for machine control, etc., a RAM for storing input/output signals and various data, and an interface for transferring input data (DI) and output data (DO) to and from the machine. These elements form the sequence program 18 and a parameter storage section 19 for controlling the function of the PMC section 14.

The parameter storage section 19 stores zone data at the start and end points of zones corresponding to zones A, B, and C, etc. The zones A, B, and C indicate ranges from 56.666 (starting point) to 41.325 mm, from 78.976 (starting point) to 58.678 mm, and from 98.025 (starting point) to 82.333 mm, respectively. A plurality of such zone data are stored in the parameter storage section 19 and can be selected by setting optional numbers using the parameters.

A function instruction 18a in the sequence program 18 fetches the current position data from the current position register 16 through a window, and further, fetches the zone data A, B, and C, etc., held by the parameter storage section 19. The function instruction compares the values of both data. Accordingly, the zone of the parameter storage section 19 to which the current position data for the servomotor 2 from the current position register 16 corresponds is determined. In accordance with the result of this determination, the number of the program to be executed is assigned to the axis control section 15. External signals 17, which include a program start or stop signal and the like, are fetched into the function instruction 18a through the input (DI).

The following is a description of the operation of the present embodiment performed before the axis control section 15 determines the program to be executed next in accordance with the current position of the servomotor 2.

First, immediately after the power is turned on or at the time of start-up, such as a reset release, the current position data for the servomotor 2 is fetched from the absolute encoder 12 contained in the servomotor 2 and input into the current position register 16. The function instruction 18a fetches the current position data for the servomotor 2 from the current position register 16 through the window, and processes the same to determine whether the fetched data corresponds to any of the individual zones of the parameter storage section 19. The function instruction 18a delivers the result of this process as a zone signal. In accordance with the state of this zone signal, a selection signal for the number of the program to be executed next is delivered to the axis control section 15. The axis control section 15 then starts the execution of the control from the program which corresponds to the program number requested by the PMC section 14.

By setting the zones of the parameter storage section 19 at optional values in this manner, the position of the servomotor 2 can be determined on the same level as the set value for the axis control section 15. Further, the numerical control device 1 can immediately execute the program corresponding to the current position of the servomotor 2 reached when the power is turned on, without the need to restore the servomotor 2 to a reference point when the power is turned on.

The parameter storage section is provided on the side of the PMC section 14 in the present embodiment, alternatively it may be provided on the side of the NC section 13. In this case, the function instruction 18a reads out data in the parameter storage section through the window, in the same manner as when reading the current position data.

Further, the function instruction 18a may be designed such that it determines whether the current position data in the current position register 16 corresponds to any of the individual regions of the parameter storage section 19, suitably processes each determination result, and assigns the number of the program to be executed to the axis control section 15 in accordance with that result. That is, respective ranges of the individual zones A, B, and C may be set to overlap one another and can be compared with the current position data so that the number of the program to be executed by the axis control section 15 can be assigned depending on whether the current position data corresponds to the zone B only, the zones A and C, or the zones B and C, etc.

According to the present invention, as described above, a user can easily obtain a zone signal output with a high detection accuracy and can improve the degree of freedom of the machine tool and working tools on a transfer line. Also, a large number of zone detection points can be established, whereby a multipurpose numerical control device for transfer machines can be realized.

We claim:

1. A numerical control device for controlling a plurality of transfer machines mounted on a transfer line, comprising:
   axis control means for controlling axes of the plurality of transfer machines; and
   PMC control means for executing a sequence control of the plurality of transfer machines, said PMC control means including:
   function instruction means for reading current position data from said axis control means, comparing the read data with previously set zone data, outputting a result of the comparison as a zone signal, and executing a modification control of an executing sequence by using the zone signal.

2. A numerical control device according to claim 1, wherein the numerical control device previously stores said zone data as parameters.

3. A numerical control device according to claim 2, further comprising a plurality of zone data so that the data can be optimally selected by numbers or symbols.

4. A method for controlling a plurality of transfer machines mounted on a transfer line in a numerical control device including a programmable machine controller, said method comprising the steps of:
   a) controlling axes of the transfer machines and the programmable machine controller;
   b) executing sequence control;
   c) reading current position data through a window of current position register means;
   d) comparing read data with previously set zone data;
   e) outputting the comparison result as a zone signal; and
   f) executing modification control of an execution sequence in accordance with the zone signal for controlling the function of the programmable machine controller.

* * * * *